United States Patent [19]
Burnett

[11] 3,841,406
[45] Oct. 15, 1974

[54] SINGLE WELL OIL RECOVERY METHOD USING CARBON DIOXIDE

[75] Inventor: David B. Burnett, Houston, Tex.

[73] Assignee: Texaco, Inc., New York, N.Y.

[22] Filed: May 17, 1972

[21] Appl. No.: 254,012

[52] U.S. Cl............................................. 166/305 R
[51] Int. Cl...................... E21b 43/16, E21b 43/25
[58] Field of Search........................... 166/265–268, 166/305 R

[56] References Cited
UNITED STATES PATENTS

| | | | |
|---|---|---|---|
| 2,724,437 | 11/1955 | Whorton et al.................... | 166/268 |
| 2,875,832 | 3/1959 | Martin et al........................ | 166/266 |
| 2,878,874 | 3/1959 | Allen................................. | 166/268 |
| 3,075,918 | 1/1963 | Holm................................. | 166/268 |
| 3,411,583 | 11/1968 | Holm et al......................... | 166/305 R |
| 3,465,823 | 9/1969 | Jacoby et al...................... | 166/305 R |
| R24,873 | 9/1960 | Lindauer............................ | 166/268 |

Primary Examiner—Henry C. Sutherland
Assistant Examiner—Jack E. Ebel
Attorney, Agent, or Firm—Thomas H. Whaley; C. G. Ries

[57] ABSTRACT

A method of recovering oil from an oil-bearing formation in which a gas having a limited solubility in oil is injected into the formation via a well, to increase the formation pressure, and thereafter a slug of carbon dioxide is injected via the same well, after which the well is produced.

8 Claims, No Drawings

SINGLE WELL OIL RECOVERY METHOD USING CARBON DIOXIDE

FIELD OF THE INVENTION

This invention relates to a method of oil recovery from a subterranean oil-bearing formation wherein a gas having a limited solubility in oil is injected via a well to increase the formation pressure in the vicinity of the well and thereafter carbon dioxide is injected via the same well. Preferably, the well is then shut-in for a short period of time after which the formation is produced from the same well.

PRIOR ART

Among the secondary recovery techniques that have been developed for obtaining additional production of residual oil after a formation can no longer be produced by primary means, has been the use of carbon dioxide. The benefits of carbon dioxide in a secondary recovery process are derived from the fact that carbon dioxide is soluble in the oil which results not only in reducing the viscosity of the oil but also in increasing the volume of the oil, both of which effects result in increased oil production. However, the use of carbon dioxide has not been without its drawbacks. For example, there is the inherent loss of the carbon dioxide in a thruput recovery operation, not only to the connate water but also to subsequent drive media in a slug type operation, which substantially reduces the effectiveness of the carbon dioxide. Some of the difficulties have been overcome by the use of carbonated water as a flood medium. Other techniques have involved the use of a hydrocarbon in combination with carbon dioxide.

Prior art has also suggested the use of a push-pull recovery technique or a well-stimulation technique for increasing the production of oil from depleted formations or from wells which have experienced declining production. In this technique, a fluid is injected into an oil-bearing formation via a well, so as to affect the immediate area surrounding the well, after which the well is shut-in for a "soak" period, and is then produced. This technique has successfully utilized steam as the injection fluid and, more recently, other fluids have been utilized, including carbon dioxide. One such technique that has been suggested involves the injection of carbon dioxide followed by the injection of a gas such as nitrogen or air.

It has now been discovered that improved well stimulation and increased oil production can be obtained by the injection of a gas such as methane prior to carbon dioxide injection, whereby additional benefits are derived from methane's limited solubility in the oil.

SUMMARY OF THE INVENTION

This invention relates to an improved oil recovery process wherein a gas having a limited solubility in oil is injected into a formation via a well traversing the formation, and thereafter a slug of carbon dioxide is injected via the same well. The well is then shut-in for a brief period of time prior to being produced.

DESCRIPTION OF THE INVENTION

In its broadest aspect, the process of the invention comprises the injection of a gas having a limited solubility into a formation via a well traversing the formation, followed by the injection of carbon dioxide via the same well, and thereafter the formation is produced from the same well. Preferably, the well is shut-in for a short period after the injection of the carbon dioxide and before the well is produced. We have found that by injecting a gas having a limited solubility, such as methane, into a formation wherein, at the pressure of the formation some of the gas is absorbed by the oil, and thereafter injecting carbon dioxide, recovery of the oil in place is increased. The gas having limited solubility, serves primarily to repressure the formation with a secondary benefit of swelling the oil and reducing its viscosity. Such secondary benefits are not obtainable with gases less soluble than methane.

The method is particularly useful for the recovery of heavy crude in shallow formations and/or in formations wherein the inherent pressure is insufficient to provide a natural driving force. By injecting the gaseous material which has limited solubility in oil, it is possible to create a pressure in the formation which, after the carbon dioxide injection, and upon conversion of the injection well to a production well, will result in a pressure differential in the formation in the vicinity of the well bore. The pressure differential created drives the oil saturated with carbon dioxide to the well from which it is produced.

In carrying out the invention it is only necessary that one well be drilled to penetrate the formation. Thereafter, a gas such as methane, natural gas or separator gas is injected into the formation via the well to establish a pressure differential in the vicinity of the well bore that is capable of providing a driving force when the well is later produced. The amount of gas to be injected generally comprises about 1 to 5 percent of the pore volume within a radial distance of about 20 to about 100 feet from the well.

Methane is to be preferred to a less soluble or sparingly soluble gas such as nitrogen, since its greater solubility is more effective in assisting the carbon dioxide in swelling the oil and reducing its viscosity. For example, at a pressure of 600 psia, the solubility of methane is about 3 times that of nitrogen. The following table shows the solubility of nitrogen, methane and carbon dioxide at various pressures expressed as K, the equilibrium constant. K is defined as the ratio of component $i$ in the gaseous phase to that component in the liquid phase at equilibrium conditions.

TABLE I

SOLUBILITY OF GASES IN CRUDE OIL AT 100° F.*

| Gas | K, at pressures of | | |
|---|---|---|---|
| | 100 psia | 500 psia | 1,000 psia |
| Carbon Dioxide | 15 | 4 | 2 |
| Methane | 40 | 9 | 5 |
| Nitrogen | — | 30 | 16 |

* From handbook of Natural Gas Engineering, FIGS. 6–31, page 250.

If the formation has a low inherent pressure it is generally preferred to repressure the formation with a pressurizing fluid such as flue gas, natural gas, nitrogen or water. Ideally, the pressure of the formation to be treated should be at least about 500 to 1000 psia to permit as great a dissolution of the carbon dioxide from the slug into the oil as possible; the greater the carbon dioxide content of oil, the lower viscosity and the more readily the oil will be recovered.

After injection of the limitedly-soluble gas, carbon dioxide is injected into the well and into the formation in an amount sufficient to establish in the vicinity of the well-bore a zone of oil saturated with carbon dioxide, so as to reduce the viscosity of the oil within a radial distance of about 20 to 100 feet from the well. The amount of carbon dioxide can be determined from calculations made from knowledge of the reservoir and solubility of carbon dioxide at reservoir conditions. It is preferred that the carbon dioxide injected contain at least 80 volume percent carbon dioxide, although gases containing less carbon dioxide may be used. The slug of injected gas may contain, in addition to carbon dioxide, methane, natural gas, nitrogen, air or mixtures thereof.

Following injection of the carbon dioxide, preferably the well is shut-in for a period of time to permit the carbon dioxide to become dissolved in the oil. Ordinarily, a shut-in period of 1 to 3 days will suffice.

In a laboratory test a mounted core was first evacuated and then saturated with water at 1000 psia, and then saturated with a simulated reservoir fluid. The system was then pressure depleted to 300 psi, and then re-pressured with methane to 600 psi. Carbon dioxide was then injected, and thereafter the system was pressure depleted to 300 psi. Results are shown in Table II. It is seen that the methane-carbon dioxide system was nearly twice as effective in recovering oil as was either the nitrogen-carbon dioxide system or nitrogen or methane alone.

TABLE II

| | PERCENT OF ORIGINAL OIL IN PLACE | |
|---|---|---|
| Type of Flood | Oil Recovery After Primary (%) | Oil Recovery After Repressuring (%) |
| Nitrogen, then Carbon Dioxide | 9.3 | 7.3 |
| Methane, then Carbon Dioxide | 10.1 | 13.1 |
| Methane only | 9.5 | 4.4 |
| Nitrogen only | 8.9 | 2.7 |

While the invention has been described in terms of one well, more than one wellbore may be treated at a given time, and also the procedure may be modified so as to use a cyclic injection method either into the same well or into neighboring wells. Both the methane gas and the carbon dioxide gas may be recovered from the produced fluids and thereafter reused in the cyclic operation.

I claim:

1. A method of recovering oil from an oil-bearing subterranean reservoir penetrated by at least one well which comprises the steps of:
   a. injecting via said well a gas having limited solubility in said oil and selected from the group of methane, natural gas, separator gas and mixtures thereof in an amount sufficient to establish in said formation in the vicinity of said well a pressure differential that is capable of providing a driving force to drive said oil to said well on subsequent production;
   b. thereafter injecting via said well a slug of carbon dioxide into said formation in an amount sufficient to establish in the vicinity of said well a zone of oil saturated with carbon dioxide;
   c. shutting-in said well;
   d. thereafter producing said well and recovering said oil from said formation.

2. The method of claim 1 wherein step (a) is preceded by injecting a pressurizing fluid via said well to repressure said formation.

3. The method of claim 1 wherein said slug of carbon dioxide contains at least 80 volume precent carbon dioxide and 20 percent gases selected from the group consisting of methane, natural gas, nitrogen, air and mixtures thereof.

4. The method of claim 1 wherein the amount of said slug of carbon dioxide is injected in sufficient amounts to saturate said formation within a radial distance of about 20 to about 100 feet of said well.

5. The method of claim 1 wherein said well is shut-in for a period of about 1 to 3 days.

6. The method of claim 2 wherein said formation is repressured to a pressure of about 500 to 1000 psia.

7. The method of claim 2 wherein said pressurizing fluid is flue gas, natural gas, nitrogen, water and mixtures thereof.

8. The method of claim 1 wherein the steps described therein are cyclically repeated until further production becomes uneconomical.

* * * * *